United States Patent [19]
Daniele et al.

[11] Patent Number: 5,099,347
[45] Date of Patent: Mar. 24, 1992

[54] FAST PACKET AND FREQUENCY SWITCH

[75] Inventors: Antonella Daniele; Alfedo De Bosio, both of Turin, Italy

[73] Assignee: Cselt - Centro Studi E Laboratori Telecomunicazioni S.p.A., Turin, Italy

[21] Appl. No.: 555,248

[22] Filed: Jul. 19, 1990

[30] Foreign Application Priority Data

Aug. 1, 1989 [IT] Italy .................. 67656 A/89

[51] Int. Cl.$^5$ .............................. H04J 14/00
[52] U.S. Cl. ................... 359/123; 359/117; 359/140
[58] Field of Search ............ 370/1, 3, 4; 359/117, 359/123, 140

[56] References Cited

U.S. PATENT DOCUMENTS

4,845,703  7/1989  Suzuki .................. 370/1

FOREIGN PATENT DOCUMENTS

0334054  9/1989  European Pat. Off. ........... 370/1

OTHER PUBLICATIONS

Demonstration of Fast Wavelength Tuning for a High Performance Packet Switch; M. S. Goodman, et al., Morristown, NJ 07960-1961.
A Photonic Knockout Switch for High-Speed Packet Networks Kai Y Eng., Apr. 2, 87; AT&T Bell Labs., Holmdel, NJ.
Optical technology Applications to Past Packet Switching, P. Cinato et al., Cselt, Turin, Italy.

Primary Examiner—Reinhard J. Eisenzopf
Assistant Examiner—L. Pascal
Attorney, Agent, or Firm—Herbert Dubno

[57]  ABSTRACT

A fast packet and frequency switch, with inputs and outputs connected to optical fibers, each allowing the transit of a certain number of different-wavelength optical carriers, modulated by serial information flows organized into packets. The packets are phase-realigned and their labels are converted under the control of external processors designed to set-up and break connections. Then a frequency conversion of the optical carriers allotted to packets is carried out and the packets are recombined into a single fiber by a passive recombination network in order to be stored into an optical loop memory, which is an optical fiber delay line. Each optical packet flow is extracted at suitable times, is frequency-converted and, among the various frequencies obtained, there are selected only those to be sent to corresponding output fibers outgoing from the switch, after having been recombined with those of the other converted flows.

4 Claims, 3 Drawing Sheets

FAST PACKET AND FREQUENCY SWITCH

FIELD OF THE INVENTION

The present invention relates to a telecommunication system using digital signals forwarded on optical transmission media and more particularly to a fast packet and frequency switch.

BACKGROUND OF THE INVENTION

The present trend in telecommunications involves transmitting and switching digital signal streams at higher and higher rates, so as to allow the exchange of increasing amounts of speech, video information and the like, in an integrated network. However electrical signal transmission and processing by electrical systems have speed limits which may be exceeded only by use of optical technologies. Advanced telecommunications networks thus have node interconnections implemented by wideband and low-attenuation optical fibers, but wherein optical-signal switching means still make use of basically electrical technologies.

Optical technology should, however, also be used in switching systems, not to hinder the potential presented by the optical fiber transmission network in terms of bandwidth. This would also help avoid repeated optical-to-electrical signal conversions and vice versa, flow splitting and recombinations, and generally all of this tricks used to overcome limitations inherent in electrical systems.

Optical and electro-optical devices, capable of acting as space switches, modulators, filters, amplifiers, and the like, which can be advantageously used in optical signal switches, have been investigated and developed. Communication systems have been developed wherein the number of functions implemented by electrical devices has been increasingly reduced. In the near future, entirely optical elements might be used also for control functions.

At the same time, fast packet switching systems, which prove to be more and more convenient to resolving the problem of integrating the switching of different-characteristic streams carrying information relevant to speech, video and data signals, are being investigated. These systems, in fact, allow resources to be exploited in an optimized way, since they occupy the network only in proportion to actual requirements, instant by instant, without requiring the structures to be strictly allotted to a connection during idle periods of the source, and which thus would remain unused.

Besides, structure and technology reliability allows heavy information processing at each network node, which would imply delays and delay variations not to be neglected in speech or video signal transmission. Thus integration of transmission and switching of such signals with data signals is possible.

Various switching systems have been described in the literature. These include systems wherein the electrical connection network consists of an optical connection network, generally controlled by electrical devices. One of them is the packet switching system described in the paper entitled: "Optical Technology Application to Fast Packet Switching" by P. Cinato and A. De Bosio, published in the Proceedings of the Conference "Topical Meeting on Photonic Switching", Mar. 1-3, 1989, Salt Lake City, U.S.A. In this system a binary optical connection network system is configured by an electrical control network which is also binary and self-routing, upon passage of electrical packets containing the routing information. At the end, the information field proper is sent into the optical network.

Another packet switch system is described in the paper entitled "Demonstration of Fast Wavelength Tuning for a High Performance Packet Switch", by M. S. Goodman et al issued in the Proceedings of ECOC 88 Conference Sept. 11-15, 1988, Brighton, UK, pages 255-258. This system uses two superimposed networks, one for routing control packets, the other for the information packets proper. At the input the optical packets are converted into electrical signals in order to be temporarily stored in memory units; then they are switched by allotting them a suitable frequency, chosen on the basis of the output towards which they are directed.

A further system has been described in the paper entitled "A Photonic Knockout Switch for High-Speed Packet Networks", by Kay Y. Eng, published in the Journal on Selected Areas in Communications, August 88, Vol. 6, n. 7, pages 1107-1116. In this case, the incoming electrical streams are converted into optical signals and sent to the switch by associating each input with a specific optical wavelength. Here all the streams are summed in a star coupler and sent towards means for selecting the wavelength to be sent to the corresponding output. A parallel network performs all the decisions inherent in the contention resolution by using an algorithm envisaging the possible packet loss. The processing result of this control network consists in commands for means selecting the flows at different wavelengths, which can thus operate to forward the streams to their corresponding outputs.

These systems either use the optical carrier to transport high-bit rate information or different wavelengths to facilitate the space switching inside the switch, but do not exploit the possibilities offered by the wideband of the optical fibers for the simultaneous transport of a plurality of channels. In other words, they use a packet and space switching, but do not use a frequency switching proper. Besides, temporarily packet memorization is performed in memories of the electronic type, after converting them from optical to electric signals.

From the switch control standpoint, both the investigated systems require a time phase for a knock-out tournament for the resolution of the conflicts at the outputs, when different packets are addressed to the same destination. That entails the necessity of substracting a time interval from the usual packet transit time, which solely depends on the bit rate of the handled flow. As a consequence, switching has to be carried out at higher rate than that required by the link bit rate.

OBJECT OF THE INVENTION

It is an object of the invention to provide a fast-packet switch overcoming drawbacks of earlier systems.

SUMMARY OF THE INVENTION

These disadvantages are overcome by fast packet and frequency switch, provided by the present invention, which, besides utilizing packet and space switching, uses a frequency-multiplexing too, thus exploiting as well as possible the capability of transport of the optical fibre from the user to the switch. In any section of the network so implemented there is the simultaneous presence of determined sets of different-frequency signals which transport in parallel a plurality of channels.

Besides, the present switch requires a limited amount of processing of electrical information signals. Moreover, residual electrical-level operations can already be designed at the optical level and, when optical technology is better developed, can actually be implemented in such technology.

The present invention provides a fast packet and frequency switch, having n inputs and n outputs connected to the same number of optical fibres, each of them allowing the transit of a certain number m of different-wavelength optical carriers, modulated by serial information flows organized into packets, consisting of a body and of a header containing the label and service fields. According to the invention, information flows present at the outputs of any n input fibers are sent to an input block, which performs packet phase realignment and label conversion, under the control of external processors for establishing and breaking the links through a first connection. The input block controls whether the packets contain some valid information communicating the result to a centralized control block consisting of an n*m FIFO memory bank, and the outgoing packets are lead to unit effecting the frequency conversion of the optical carriers allotted to packets, according to the commands received from a control block, which communicates the new frequencies allotted to the centralized control block, and outgoing packets are recombined into a single fiber by a recombining passive network, to be memorized in an optical loop memory with q locations, consisting of a delay line made of an optical fiber formed by fiber trunks, of an input coupling device, which permits packet immission and extraction. A device is provided for regenerating the stored packets or suppressing the extracted packets, under the control of the control block. Then the optical flow of the extracted packets is sent to a passive power splitter, wherein it is split into m parts, sent to a frequency conversion block, which converts only one of the packets to the frequency allotted to the same on the fiber outgoing from the switch and all the others to a discarding frequency. Finally the new-frequency packets are recombined in a passive recombining device, together with those coming from the other frequency conversion blocks, to form the flows on the output optical fibers.

BRIEF DESCRIPTION OF THE DRAWING

The foregoing and other characteristics of the present invention will be made clearer by the following description of a preferred embodiment with reference to the accompanying drawing in which.

SPECIFIC DESCRIPTION

Figure 1:
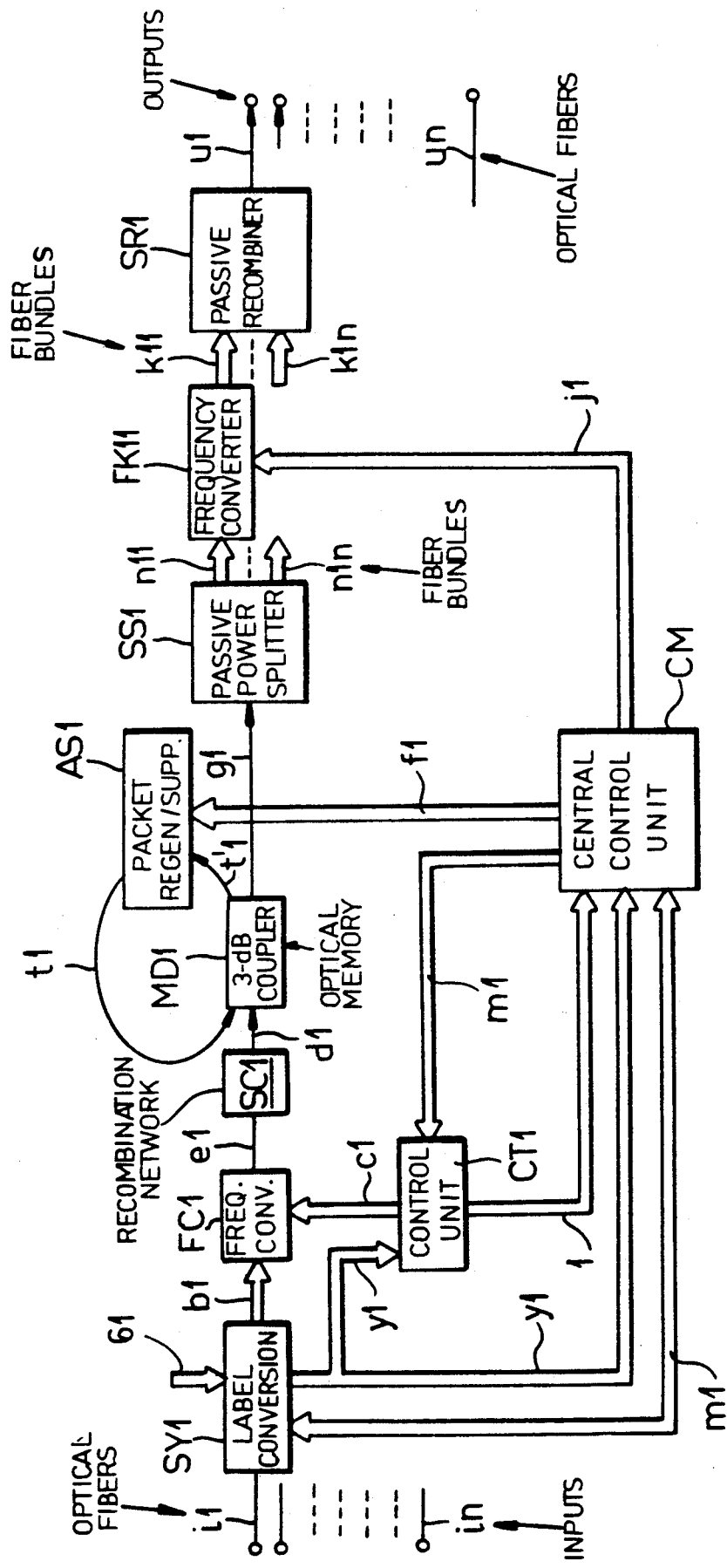
FIG. 1 is an over-all block diagram of the switch.

As shown in FIG. 1, the switch presents n inputs and n outputs, connected to as many optical fibers i1 ... in, u1 ... un, whereupon a certain number m of optical carriers of different wavelengths can transit. They are modulated by serial information flows organized into packets. Each packet consists of a header and a body, carrying information data. The body has a fixed length of the order of 500 bits through the whole network and is processed only by the receiving terminal. The header has a length of about 50 bits and contains the label and service fields, such as for instance the information as to full or empty packet, possible error correcting fields of the label, et cetera.

Each call arriving at the switch can then be defined on the basis of three parameters, i.e., the number of the input at which the optical fiber is connected, varying from 1 to n, the wavelength of one of the optical carriers transitting on the fiber, whose number can vary from 1 to m and the label. Said parameters have a validity limited to each inter-switch trunk, that is why calls with the same parameters on different trunks can arrive from different users and be directed to different users. That permits maximum network flexibility in terms of availability of all the possible assignments by each switch. In addition to the advantage offered by the flexibility of packet switching technology, one can dispose of the further degree of freedom in the label assignment, due to the possibility of choosing the optical wavelength.

FIG. 1 shows all the blocks necessary to handle the switching of the calls present on a single optical fiber, apart from a control block common to all the calls. It is clear that there is a corresponding number of blocks for the other n-1 inputs.

The m information flows present at the output of any fiber, e.g. the fiber i1, are sent to a block SY1, which performs the packet phase realignment and the conversion of the label.

Analogous blocks are connected to the other n-1 fibers, but they are not shown in FIG. 1 not to complicate the drawing further.

The necessity of utilizing these blocks derives from the fact that the packets are presented at the inputs of the switch with different delays, due to the differences in the transmission phases and to the propagation times through the optical fiber trunks having different lengths. After realignment, all the headers of the packets belonging to different optical fibers and optical carriers of different wavelengths are present at the same time at the output of corresponding block SY1.

Besides, packet switching requires the conversion of the label through an association memory. The aim of this operation, which is a switching operation, is of exploiting network flexibility, as already mentioned, by alloting each packet the most convenient label along each trunk. This conversion is performed in block SY1, helped by a memory of the electrical type. The information relevant to the correct association between old and new label are supplied through multiple connection 61, connected to the switch processor not shown in the Figure. Said processors, effective with link set-up and disconnection, know both the new and the old labels.

Besides, block SY1 is also capable of establishing whether the packets contain valid information or whether the line is in idle condition. The valid packet condition is detected by decoding a suitable packet field containing the bit relevant to the activity state. In the case in which an active packet is detected, a suitable signal is sent to a centralized control block CM through connection y1. Block CM contains the information relevant to the call, defined during the link set-up phase, and according to this information it can establish for each arriving packet the network gate it is directed to, by allotting it a certain output optical fiber and on that a certain carrier frequency.

At the output from SY1 the packets are lead from a multiple connection b1 to a block FC1 performing a frequency conversion of the optical carriers allotted to the packets, according to the commands received by a control block CT1 on the multiple connection c1. Block CT1 communicates the new frequencies allotted to the centralized control block CM through connection p1.

Frequency converter FC1 can be implemented in two different ways, according to whether block SY1 supplies on connection b1 an electrical or an optical flow.

FC1 can use the electrical flow to modulate an optical carrier at the new frequency. Said carrier is generated by a laser at an emission frequency which can be controlled by an electrical command, e.g. a laser DFB of the type described in Journal of Lightwave Technology, Vol. 6, N. 11,11/88, in the article by K. Kobayashi et alii, entitled "Single Frequency and Tunable Laser Diodes".

As an alternative, FC1 can operate the frequency conversion by acting directly on the optical flow supplied by SY1 on connection b1, the output frequency selection being always obtained by an electrical command which changes the frequency of conversion optical-carrier. This type of conversion exploits techniques already known in the literature (Electronics Letters, 18/8/88, Vol. 24, No. 17, pages 1106-1107). Such a structure, although it is technologically weaker, has the advantage of allowing a replacement of electro-optic block SY1 with a pure optical block, whenever the technology may be mature, without any further modification.

The packets outgoing from FC1 on the fiber bundle e1 are recombined into a single fiber d1 by a passive recombination network SC1. Fiber d1 is a pure delay line, long enough to allow control unit CM to process the information received at that time interval and take the decisions useful for conflict resolutions on the outputs, as will be described hereinafter.

The packets outgoing from fiber di are then submitted to a statistic storing operation in a subsequent optical memory device, which controls the conflicts at the outputs of the packets directed at the same time to the same destination. Thanks to this storage, the packets, which only differ in the call logic-channel number, are placed in the waiting condition preventing the same optical fiber and the same output frequency from being occupied at the same time. Using known algorithms it is possible to effect the best management of these conflicts by placing all contending packets, save one, in idle condition by suitable priority rules.

Packet storage is performed by an optical loop memory, consisting both of an optical fiber delay line, formed by trunks t1 and t'1, and of devices MD1 and AS1. Memory locations, in a number equal to q, are realized by offering to each packet which is to be memorized a carrier with a different optical wavelength inside the delay line t1, t'1. The value of q can be established on the basis of considerations on the statistics of the traffic handled by the switch, e.g., for a switch with n=16, m=10 and a factor of utilization of the connection of 0.5, q can vary between 50 and 100 as a function of the loss probability one wants to obtain.

The set of packets, which at a determined time instant is present on the fiber d1, accesses the delay line t'1 by an input coupling device MD1 of the type suggested e.g. in SPIE, Vol. 479 Fiber Optic Couplers, Connectors, And Splice Technology (1984) pages 2-8, in the article by C. M. Ragdale et al, entitled "Review of fused single node coupler technology" and circulates inside the loop t1 covering it within a packet time period. At the end of a complete round the set of packets present on the delay line starts with a new round, spatially side by side with a new set of packets arriving on different wavelengths. The preceding set is extracted, and, at the same time, sent onto the fiber g1 to extract among the present packets those that at that time interval have to be forwarded through the network.

The device allows the flow both to transmit undisturbed as far as to a fiber gl and to be inserted with half the power into the fiber t'1, side by side with the frequencies present in the loop, waiting for the switching. At each round inside the loop all the packets are offered to the subsequent space network for the switching, but not all can be switched, that is why some of them remain in the loop. This double function (sending the packets to the space network and storing them again) is carried out by a 3-dB directional coupler forming the coupler MD1, which mixes the signals present at its inputs and splits them at its outputs.

Owing to the loss of half the optical power due to the insertion of coupler MD1 into optical fiber loop t1, t'1, the packets, which are to remain in waiting state inside the memory, are regenerated by a device AS1, which is a set of q frequency-selective optical amplifiers placed around the loop. Said amplifiers carry out also the function of suppressing the packets that, in that time interval, are sent towards the subsequent block to be switched.

Each amplifier of device AS1 is driven through the multiple connection f1 by control block CM, which controls packet switching. According to whether the packet stored in t1 on a particular wavelength is still to be kept circulating or switched, the corresponding amplifier is placed in the state of amplification or attenuation.

The optical flow extracted from delay line t1, present on the optical fiber g1, is sent to a passive power splitter SS1 wherein is split into n*m parts, namely as many parts as are the there are inputs (or outputs) of the network, i.e. n, multiplied by the number of channels on each connection, i.e. m. The flows obtained are supplied to n output optical fiber bundles h11,h12, ... ,hln, each bundle consisting of m fibers.

Power splitter SS1 can be implemented by a plurality of 2×2 couplers in fused fiber, binary-tree connection. In this case one only of the two inputs and two outputs of each coupler are used. As an alternative a device of the type described in the U.S. Pat. No. 4,722,582 granted in the U.S. on the Feb. 2, 1989 can be used.

The flows at the output of splitter SS1 are sent to a frequency conversion block FK11. In the Figure each flow on one of the fibers of bundle h11, consisting of packets at the frequencies used within the delay line, is sent to one of m frequency converters housed in conversion block FK11, which converts only one packet to the frequency allotted to the same on the fiber outgoing from the switch and all the others to a frequency used only with the aim of discarding them, since they need not access the outgoing fiber.

Conversion block FK11 can be implemented as the already-described block FC1.

The packets obtained in this way, present on fiber bundle kll, are recombined by a passive recombining device SR1 together with those coming from the other frequency-converting blocks, not shown in the Figure, through bundles of m fibers k12, ..., kln. Thus each optical fiber u1, u2, ..., un outgoing from the switch receives as many flows as are input fibers i1, i2, ..., in and all coming from any set of different inputs; it is possible that a plurality of packets may arrive from the same input.

The recombining device SR1 is equal to power splitter SS1, used this time by inverting the inputs with the outputs.

The assembly of blocks SS1, FK1 and SR1 forms a pure passive space switching network, internally having frequency converting stages, controlled by control block CM through multiple connection j1.

Control block CM consists of a memory bank controlled by First-in First-out rules (FIFO); the number of such memories is equal to the number of channels handled by the switch, i.e. n*m, and contains the sequence of addresses, consisting of the codes of channel and frequency, to which the packets have to be sent.

Such sequences of addresses are stored according to the arrival order, and serve to reconstruct the correct sending sequence, as well as the allocation of the packets to be switched. At each time interval the arriving packets are processed by label converter SY1, from which the control block receives on connection m1 the information relevant to the outgoing channel/frequency pair to which the packet is sent, as well as its activity state. On the base of this information block CM selects the memory relevant to the outputs (channel/frequency) to which the arriving packets are forwarded, and writes into them the information relevant to the location where the packets have been stored (link/frequency). CM carries out this operation on all the packets arriving within that time interval, and is to carry out a reading of all the queue headers, in order to extract the driving signals of the devices entitled to operate the frequency conversion.

Analogous structures have already been used in other fast packet switching systems. A description can be found, e.g., in ICC '87, page 769 and ff., in the paper presented by J. P. Coudreuse et al, entitled "Prelude: An Asynchronous Time Division Switched Network".

Figure 2:
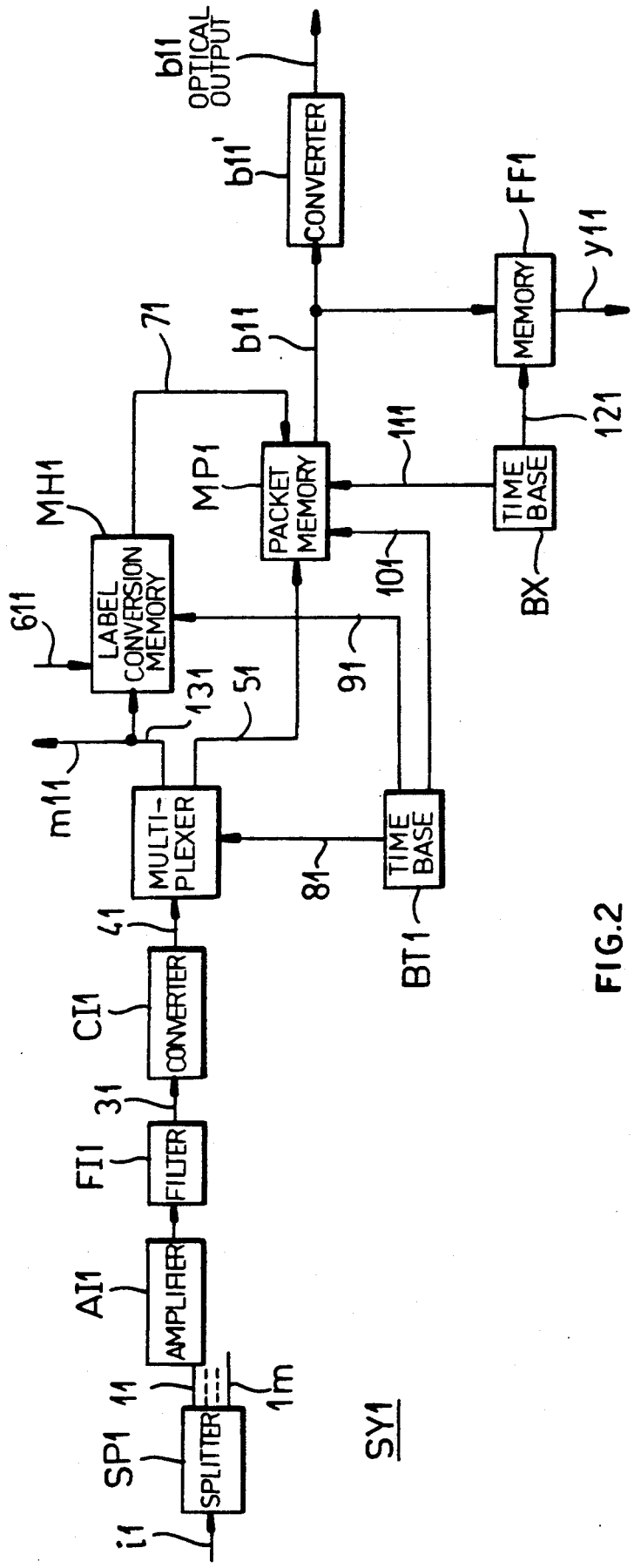
FIG. 2 is a block diagram of the block or unit by SY1 of FIG. 1.

Block SY1, which carries out packet phase realignment and label conversion and controls the packet activity state, is shown in greater in FIG. 2.

Fiber i1 accesses a power splitter SP1, which splits the incoming optical signal into m parts, sent to a corresponding number of output fibers 11,... 1m. As already mentioned, m indicates the number of different frequencies present on each incoming fiber i1, ... in. The m signals at different frequencies present on one of the fibers outgoing from SP1, e.g. fiber 11, enter an amplification block Al1, where they are amplified, then they are filtered in a bandpass filter F11.

A convenient filter could be of the type described on page 243 of the Proceedings of ECOC 88 Conference, Brighton, Sept. 11-15, 1988.

The only signal present the F11 output on fiber 31 is converted into an electrical signal by a converter Cl1. This signal is sent through wire 41 to a multiplexer Ml1 which acts on the individual packets so as to separate the header, where there is the label to be modified, from the body.

Multiplexer Ml1 is controlled through wire 81 by a time base BT1 so that it forwards on wire 131 the header toward label conversion memory MH1 or on wire 51 the body towards a packet memory MP1.

Time base BT1 is synchronized with signal timing arriving on the input optical fiber if by a suitable procedure consisting of detection of a suitable synchronism binary sequence, of particular codes of the the information flows, etc., thus allowing also identification of the beginning and end of each packet on a particular input optical fiber . In fact, each switch input needs to be handled autonomously from a synchronism point of view, since phase relations between one switch input and another are not known a priori.

Writing of memories MP1 and MH1 is driven by time base BT1 through wires 91 and 101, respectively. While the packet body is written in MP1, memory MH1 performs the necessary processing operations on the label and rewrites through wire 71 the updated label in memory MP1, and, through wire m11 which with other analogous wires forms connection m1 in FIG. 1, sends central control unit CM the routing information of the arriving packet. Information relevant to the correct association between old and new label is supplied to memory MH1 through wire 611, connected to the other analogous wires, so as to form connection 61 of FIG. 1, to switch processors.

Phase realignment of the packets present on all optical input fibers to the switch is carried out through the simultaneous reading of all mxn memories MP1, through the command signal supplied on wire 111 by a time base BX, common to all the switch units. At the output from memory MP1 the flow of packets of a connection is available on wire b11, which with the wires coming from the other m alignment memories MP2 ... MPn, not shown in the Figure, forms the multiple connection b1 of FIG. 1.

Still in FIG. 2, the activity field detection function corresponds to decoding the level of one bit, which is synchronously picked up from wire b11 by memory unit FF1, clocked by time base BX through the signal on wire 121. The information is supplied through wire y11 to centralized control block CM, which will use it as an enabling/inhibiting of a number of operations, as will be explained hereinafter. Wire y11 with other of the same kind forms connection y1 of FIG. 1. Where the output b11 is an optical output, the electrical/optical converter b11' can be provided.

Block SY can be in the future replaced by an entirely optical block, once optical memory technology is sufficiently mature. As long as for the implementation of the synchronizing function an electronic technique is used, the necessary optical/electrical conversion can be exploited in the subsequent blocks for implementing other functions that in the near future can be implemented in optical technology, while nowadays, according to the cases, they can be better implemented with electrical technology. An example is the function of detecting the packet activity field which, owing to the better maturity of the electrical logic circuits, if compared to optical ones, can be incorporated in the electrical synchronization block, rather than in the others implemented with all-optical technology.

Figure 3:
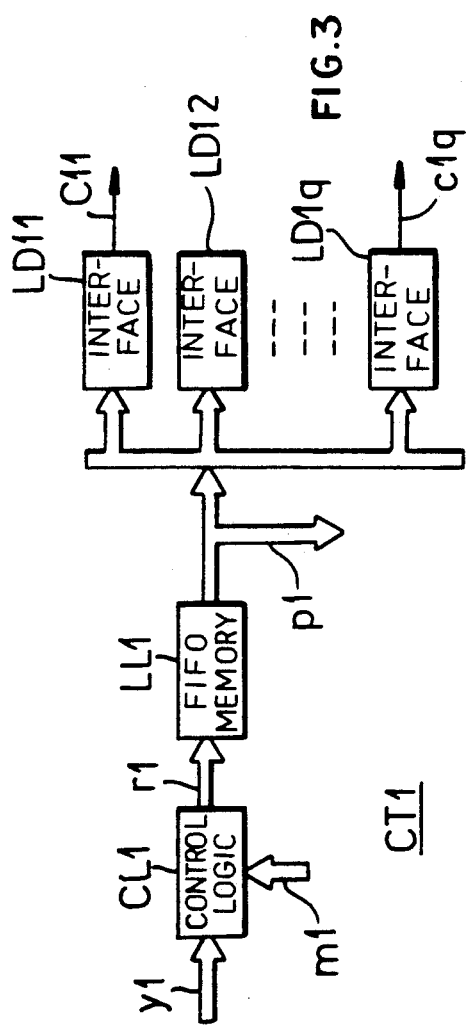
FIG. 3 is a block diagram of the block or unit by CT1 of FIG. 1.

Control block CT1 of FIG. 1 is represented in greater detail in FIG. 3.

Through multiple connection y1 it receives the information relevant to the active packet number and through multiple connection m1, packet routing information. A control logic CL1, on the basis of this information and on the number of locations of the optical memory t1, t'1, which at that instant are busy, decides how many requests received can be forwarded towards a memory LL1 of the FIFO type on connection rl.

This memory contains the list of the locations of loop t1, t'1 which are free and is updated whenever a loop frequency is used or released. LL1 automatically converts the requests of logic CL1 into a sequence of codes relevant to the free frequencies, it sends to interfaces LD11, LD12, ..., LD1q through multiple connection p1. Said interfaces, which allow the driving of frequency converters FC1 (FIG. 1), are duly clocked by centralized time base BX (FIG. 2) so as to enable the conversion synchronously with packet arrival.

The analog signals at interface outputs c11 ... c1q act on laser devices housed in frequency converter FC1 (FIG. 1), determining packet output frequency. Wires c11 ... c1q form connection c1 of FIG. 1.

Multiple connection p1 is rendered available also outside block CT1 for centralized control block CM (FIG. 1), to inform it of loop optical-memory locations allotted to the packets.

Figure 4:
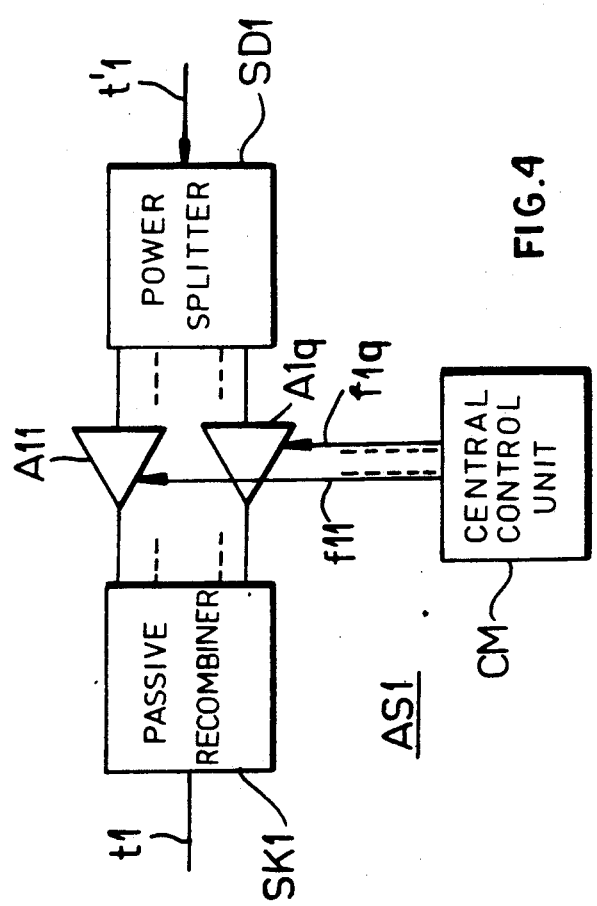
FIG. 4 is a block diagram of the block or unit by AS1 of FIG. 1.

Device AS1, placed along the loop memory to regenerate the stored packets, is shown in FIG. 4. It is composed of a passive power splitter network SD1, whose outputs supply a bank of selective amplifiers A11 ... A1q, which supply in turn amplified optical signals to a passive recombining network SK1.

SK1 output is connected to fiber t1 of the loop memory. Selective amplifiers A11 ... A1q can be implemented, e.g., with DFB lasers, controlled by wires f11 . . . f1q, coming from centralized control block CM of FIG. 1. Of course, packets switched during the present time interval, and which are not to remain in the optical memory, are suppressed by turning off the corresponding amplifier.

We claim:

1. A fast packet and frequency switch comprising:
   n inputs;
   n outputs;
   a respective optical fiber connected to each of said inputs and a respective optical fiber connected to each of said outputs, each of said optical fibers permitting transit of m different-wavelength optical carriers modulated by serial information streams organized in packets, each of said packets consisting of a body and of a header, said header containing label and service fields of a respective packet;
   a respective input unit connected to each of said inputs and receiving m information streams thereof and controlled by an external processor for effecting packet phase realignment and label conversion of the said m information streams and determining whether the packets thereof contain valid information, m and n being whole-number integers;
   a centralized control unit connected to said input units and receiving signals therefrom representing said valid information, said centralized control unit comprising an n·m FIFO memory bank;
   a frequency conversion unit connected to an output of each input unit and receiving packets outgoing therefrom for effecting frequency conversion of the optical carriers allotted to said packets according to commands received by said frequency conversion unit;
   a control circuit connected to said centralized control unit and to said frequency conversion unit for supplying said commands to said frequency conversion unit and for communicating new frequencies allotted to said packets to said centralized control unit;
   a respective passive recombining network connected to each of said frequency conversion units and recombining outgoing packets from the respective frequency conversion unit onto a single fiber;
   an optical-loop memory having q locations and including:
   an optical fiber delay line formed by fiber trunks connected in a loop,
   an input coupling device connected to said single fiber and provided along said delay line for packet immission and extraction, and
   a device along said loop and connected to said centralized control unit for selectively regenerating stored packets and suppressing extracted packets in response to said centralized control unit, said optical-loop memory having an optical output stream of extracted packets;
   a passive power splitter connected to said optical-loop memory, receiving said optical output stream of extracted packets, and splitting said optical output stream into m parts;
   a respective output frequency converter receiving said parts for converting only one of the extracted packets to a frequency allotted to said one of said extracted packets and assigned to a respective one of said n outputs and a respective optical fiber connected thereto, and converting all others of the extracted packets to a discarding frequency, thereby forming from the packets frequency converted to frequencies to a respective one of said n outputs and a respective optical fiber connected thereto new-frequency packets from the output frequency converters receiving the parts resulting from all of said information streams at all of said fibers connected to said n inputs; and
   a respective passive recombining device connected to each of said n outputs and receiving all of the new-information packets assigned to the respective one of then outputs from said output frequency converters for forming a flow on the optical fiber connected to the respective passive recombining device.

2. The fast packet and frequency switch define in claim 1 wherein each of said input units comprises:
   a power splitter for splitting an input optical signal into m parts;
   an amplifier connected to said splitter for amplifying each of said parts;
   a band pass filter connected to said amplifier and outputting an optical signal;
   an electro-optical converter connected to said filter and receiving the optical signal therefrom for converting said optical signal to an electrical signal;
   a multiplexer receiving said electrical signal and separating from an information packet represented thereby, a header from a body thereof, said multiplexer being controlled by a time base;
   a conversion memory receiving the header separated by said multiplexer; and
   a packet memory connected to said multiplexer and receiving the body separated by said multiplexer, the label in said conversion memory being rewritten under external processor control and phase realignment being carried out through contemporaneous reading of said packet memory and decoding of the level of a bit synchronously picked up by a memory unit.

3. The fast packet and frequency switch defined in claim 1 wherein each of said control circuits comprises a control logic responsive to said valid information relevant to a number of active packets and of frequencies of said optical memory which are allotted, for forwarding received connection requests, an FIFO memory connected to said control logic and receiving the forwarded connection requests for emitting a sequence of codes relevant to free frequencies, and interfaces between said FIFO memory for driving said frequency conversion units to effect frequency conversion at said frequency conversion units.

4. The fast packet and frequency switch defined in claim 1 wherein said device for selectively regenerating stored packets and suppressing extracted packets comprises a passive power splitting network having a plurality of outputs, a bank of selective amplifiers connected to the outputs of said passive power splitting network for supplying amplified signals, and a passive recombining network connected to said selective amplifiers.

* * * * *